United States Patent [19]
Fullbeck

[11] Patent Number: 5,425,605
[45] Date of Patent: Jun. 20, 1995

[54] STAND-ALONE DEBURRING APPARATUS

[75] Inventor: Wolfgang Fullbeck, Lawrenceburg, Ind.

[73] Assignee: Ace Manufacturing Co., Cincinnati, Ohio

[21] Appl. No.: 282,974

[22] Filed: Jul. 29, 1994

[51] Int. Cl.[6] .............................................. B23C 3/12
[52] U.S. Cl. ...................................... 409/140; 409/143
[58] Field of Search ............. 29/33 A, 27 C; 409/143, 409/140, 215, 131, 218, 220; 408/223, 241.5

[56] References Cited

U.S. PATENT DOCUMENTS

| | | | |
|---|---|---|---|
| 548,822 | 10/1895 | Stirling | 409/143 |
| 824,322 | 6/1906 | Wilner et al. | 409/143 X |
| 2,363,444 | 11/1944 | Shipman | 409/143 X |
| 2,372,913 | 4/1945 | Schmidt | 409/143 |
| 2,475,227 | 7/1949 | Evans | 409/143 |
| 2,552,755 | 5/1951 | Weaver . | |
| 2,777,340 | 1/1957 | Hettwer et al. . | |
| 2,899,867 | 8/1959 | Brayack . | |
| 3,590,671 | 7/1971 | Wahli | 408/228 |
| 3,712,174 | 1/1973 | Granfield | 409/138 |
| 3,722,362 | 3/1973 | Pitts et al. | 409/299 |
| 4,251,175 | 2/1981 | Hara et al. | 409/140 |
| 4,274,770 | 6/1981 | Singer | 408/211 |
| 4,400,859 | 8/1983 | Wotthal et al. | 29/27 C |
| 4,498,820 | 2/1985 | Brennan | 409/179 |
| 4,514,121 | 4/1985 | Fuchs, Jr. | 409/138 |
| 4,557,644 | 12/1985 | Scepanovic et al. | 409/143 |
| 4,784,540 | 11/1988 | Underhaug | 409/140 |
| 4,787,786 | 11/1988 | Freud et al. | 409/237 X |
| 5,184,927 | 2/1993 | Judy | 409/143 |
| 5,238,338 | 8/1993 | Stucky | 409/143 |

FOREIGN PATENT DOCUMENTS

| | | | |
|---|---|---|---|
| 256304 | 10/1988 | Japan | 409/143 |
| 1337206 | 9/1987 | U.S.S.R. | 409/143 |

*Primary Examiner*—William Briggs
*Attorney, Agent, or Firm*—Wood, Herron & Evans

[57] ABSTRACT

A stand-alone deburring apparatus greatly facilitates accurate deburring of difficult-to-access burrs located inside tubes, and does so in a manner which eliminates the need to tie up another more cumbersome and costly piece of machinery, such as a drill press. The apparatus includes a base plate, a motor with a horizontal shaft mounted to the base plate and a deburring body mounted vertically, adjacent the end of the shaft. The shaft coacts with toothed gears inside the body to rotatably drive the gears and a horizontally-oriented countersink coupled thereto. An adjustable collar provides a support surface or platform for supporting a tube to be deburred in alignment with the axis of the vertical body. With the vertically-oriented body, the horizontally-oriented countersink and the adjustable collar, the inside of a tube may be easily deburred while held in vertical orientation. This invention enhances the accuracy, the versatility and the availability of deburring operations for deburring the insides of tubes, for a relatively wide range of tube diameters and burr locations.

18 Claims, 2 Drawing Sheets

STAND-ALONE DEBURRING APPARATUS

FIELD OF THE INVENTION

This invention relates to a deburring apparatus which enhances the accuracy, versatility and the availability of deburring operations for deburring the inside edges of drilled holes cut in tubes or machined parts.

BACKGROUND OF THE INVENTION

In many manufacturing operations, metal articles are cut or machined in a manner which leaves a burr. Removal of these burrs, referred to as deburring, has become an important step in the overall manufacturing process. A manufactured article will not be considered good quality, and in most cases not even of acceptable quality, unless it is free of burrs. This is particularly true as quality standards increase. Thus, for many machined articles it is essential to achieve uniform and accurate deburring.

For some parts, deburring may be performed manually at a grinding station, using a grinding wheel. However, this method is not suitable for parts which are machined in such a way that there is no easy access to the burr. For instance, a tube which has one or more holes cut therein and oriented perpendicular to the tube axis will almost always have a burr along the inside edge, adjacent the holes.

To remove burrs of this type, it is necessary to extend some type of cutting tool into the end of the tube, with the distance of extension depending upon the distance of the hole from the end of the tube. The greater this distance, the more difficult the deburring operation. Also, if the tube has a relatively small inner diameter, this deburring operation becomes even more difficult.

While it is known to utilize machines of various type to perform operations such as cutting, champferring, grinding, machining, etc. at the ends of tubes, generally machines of this type are relatively complex, expensive and particularly suited to only one type of machining operation. Thus, such machines are not readily suited for the seemingly simple operation of removing burrs located inside of a tube, especially when such burrs must be removed from tubes of varying sizes and shapes, and with differently shaped holes.

Applicant developed a deburring piece which, in conjunction with a standard drill press, has proved suitable for deburring the inner edge of a hole accessible only via the inside surface of a tube. This deburring piece mounts to the vertical chuck of the drill press and has a midsection which extends horizontally in cantilever fashion from the axis of the drill. A vertically oriented countersink located at the outer end of the midsection is rotatably driven about a vertical axis via operation of the drill press. The rotation of the drill is coupled to the countersink via gears housed in the midsection. By manually extending a tube around the midsection in the proper orientation, with the tube oriented horizontal, the rotating countersink may be used to remove any burrs located along the inside surface of the tube, particularly burrs surrounding the inner edges of holes.

This manner of deburring tubes requires the use of the drill press, thus occupying a relatively cumbersome and awkward piece of machinery with an operation for which it has not been specifically designed. Also, to change over from deburring to drilling operations, and vice versa, additional manufacturing time is lost. As a result, when using a drill press for deburring, the seemingly simple operation of deburring has a disproportionately high cost.

With respect to the actual deburring step, because of the cantilevered orientation of the midsection with respect to the vertical drill, the midsection may sag downwardly to some degree at its outer end, particularly if the midsection is relatively long and extends a substantial distance into the tube. This sag adversely affects the gear drive, which may result in inconsistent or poor quality burr removal from the inside of the tube. Thus, to some degree, the distance of the hole to be deburred from the end of the tube dictates the overall consistency of burr removal.

Finally, in the past, internal deburring has generally not been regarded as a manufacturing operation which merits separate machinery, or a separate dedicated work station. Rather, deburring has been regarded as an ancillary operation.

SUMMARY OF THE INVENTION

It is an object of this invention to reduce the costs associated with deburring the inside surface of a tube.

It is another object of the invention to enhance uniformity in burr removal from the inside surfaces of tubes, particularly along the inner edges of holes cut in the tubes, regardless of the distance of the holes from the end of the tubes.

It is still another object of the invention to enhance overall versatility in removing burrs from the inside surfaces of tubes, at minimal cost.

This invention achieves the above-stated objects by utilizing a stand-alone deburring apparatus with a horizontally oriented countersink to remove burrs from the inside of a tube held in vertical orientation, and while supported on a horizontal support surface of a collar surrounding the body. Because this deburring apparatus is designed to be used as a stand-alone device, used only for deburring, there is no need to tie up a drill press for deburring operations. No time is lost changing over between drilling and deburring, and vice versa. This results in a cost savings, compared to performing deburring operations with a drill press.

Because the countersink is oriented horizontally so as to rotate about a horizontal axis, and mounted to a vertically oriented body which houses a gear drive, the tube may be oriented vertically in axial alignment with the body during burr removal. With the collar being vertically adjustable with respect to the countersink, the apparatus can be readily adapted to accommodate deburring of holes located various distances from the end of the tube. Because the body is oriented vertically and not susceptible to sagging, this invention also promotes consistency in the removal of burrs located inside of tubes.

According to a first preferred embodiment of the invention, a stand-alone deburring apparatus includes a base plate, a motor, a horizontal shaft rotatably driven by the motor and a body mounted vertically adjacent an end of the shaft. The body is recessed in a block mounted to the base plate. The body houses a plurality of intermeshed, toothed gears, with a lowermost of the gears coacting with the shaft to be rotatably driven thereby, and to also drive the rest of the gears. An uppermost of the gears coacts with an inner portion of a horizontally oriented countersink mounted adjacent the top of the body, thereby to rotate the countersink about its longitudinal, horizontal axis upon rotation of the shaft. The countersink also includes an outer portion machined for deburring during right-handed rotation.

A collar surrounds the body and is vertically adjustable with respect to the countersink, as by threaded engagement with the body. The collar has a top support surface for supporting a tube in vertical orientation, in axial alignment with the body during deburring.

According to a second preferred embodiment of the invention, a collar section surrounds the body and is supported at a selectable distance above the block via at least two posts.

A control panel for controlling operation of the motor may be mounted to a second plate hingedly connected to the base plate. This facilitates operation of the apparatus in a convenient manner. Also, a light housing adapted to receive a light may be mounted to the motor or the plate, via a flexible conduit, thereby to direct light in a manner desired to facilitate viewing by the operator during burr removal.

By using interchangeable bodies of varying dimension and/or varying diameters for the countersink, this stand-alone deburring apparatus may be used to deburr tubes having substantial variation in inner diameter, hole diameter and hold distance to the end of the tube.

These and other features of the invention will be more readily understood in view of the following detailed description and the drawings.

DETAILED DESCRIPTION OF THE INVENTION

Figure 1:
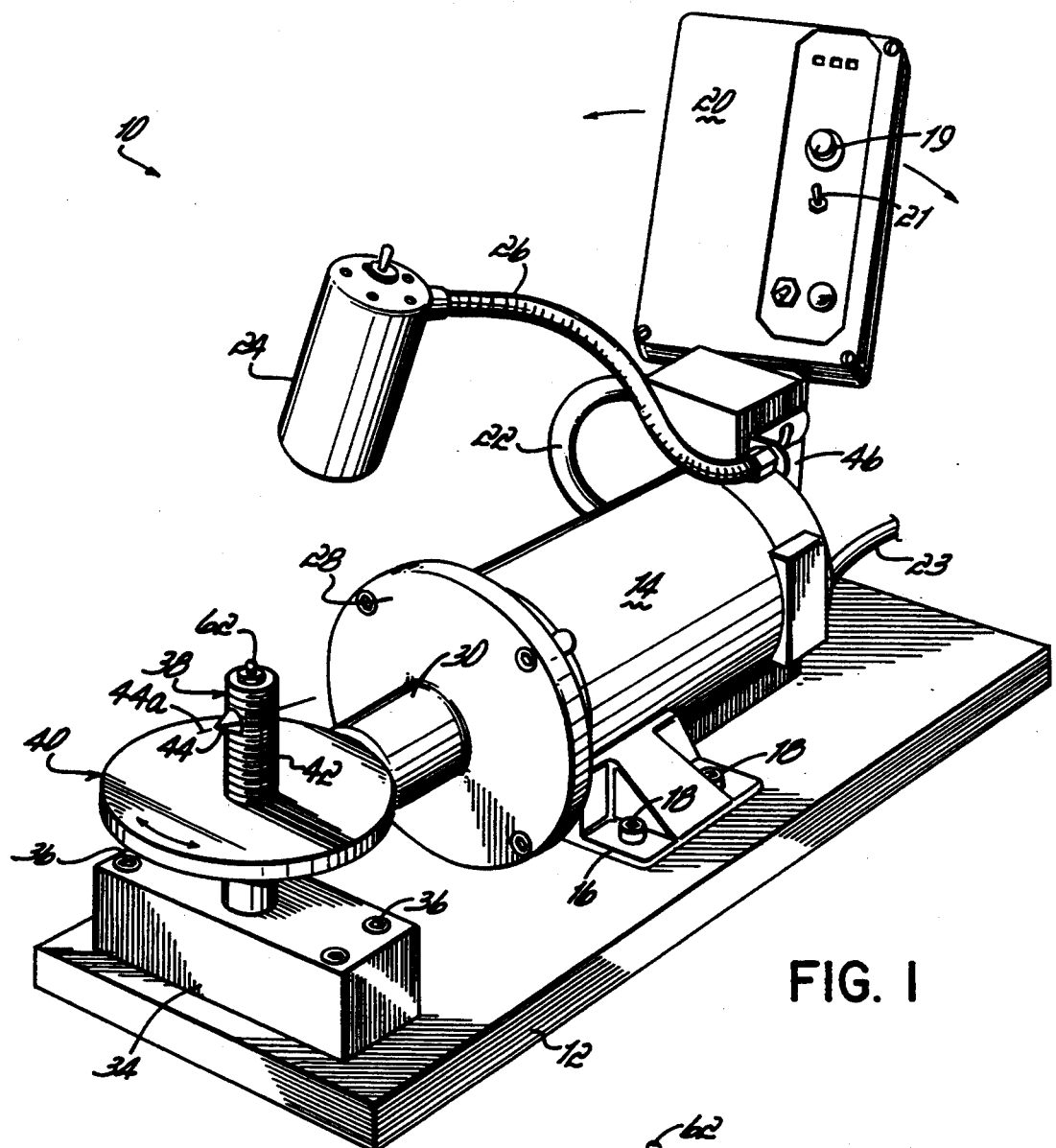
FIG. 1 is a perspective view of a stand-alone deburring apparatus constructed in accordance with a first preferred embodiment of the invention.

FIG. 1 is a perspective view of a stand-alone deburring apparatus 10 constructed in accordance with a first preferred embodiment of the invention. The apparatus 10 includes a base plate 12 which is of suitable dimension and sturdiness to support the other components of the apparatus 10. If desired, the base plate 12 may be permanently or temporarily mounted to the surface of a table, or supplied with supports or legs.

The base plate 12 supports a motor 14. Preferably, the motor 14 is a variable speed d.c. motor. The motor 14 is held to the base plate 12 on opposite sides by braces 16, which are secured by bolts 18. Electrical controls for operating the motor 14 are preferably mounted to a freestanding control panel 20, which is spatially removed from the motor 14, but connected thereto via electrical conductors (not shown) extended through a flexible conduit 22. As shown in FIG. 1, the control panel 20 includes on/off and speed controls for selective operation of the motor 14. Electrical power for driving the motor 14 is supplied via a conventional electrical line (not shown) connectable into an electrical outlet (not shown) supplying 110 volts a.c. If desired, a light housing 24 may be used to support a light (not shown) therein, thereby to facilitate viewing of burring operations, with the light housing 24 operatively connected to the motor 14 via a flexible conduit 26 through which electrical conductors (not shown) extend.

Figure 2:
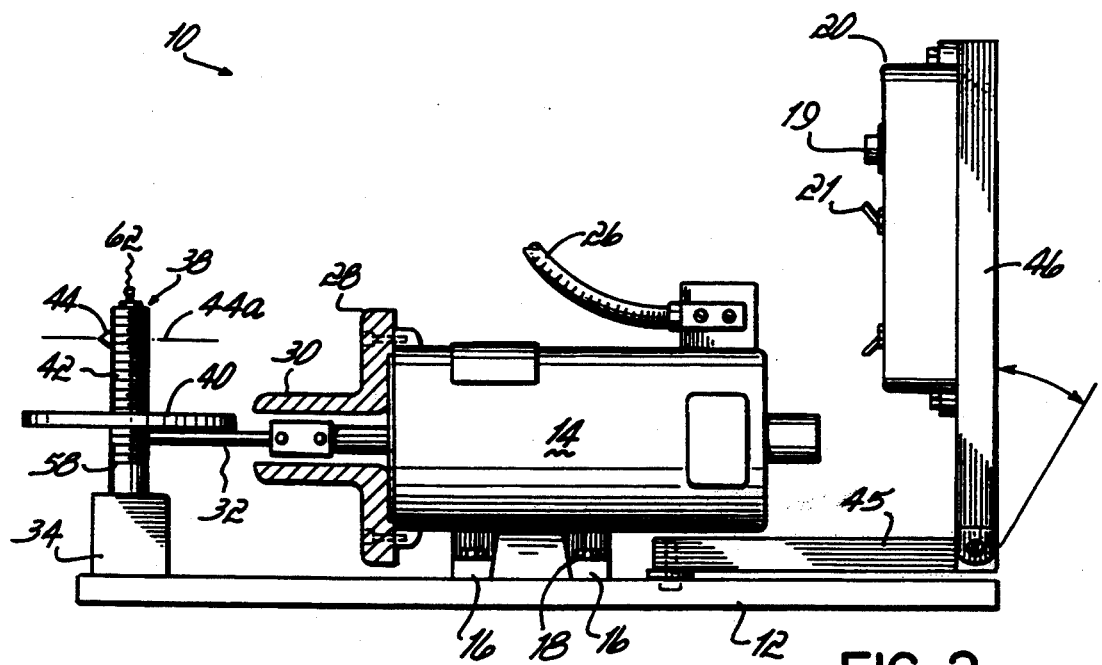
FIG. 2 is a side view of a stand-alone deburring apparatus constructed in accordance with the invention, with some variation from the apparatus shown in FIG. 1.

The motor 14, or more particularly the motor housing has an end wall 26 which converges to a hub shape 30. A shaft 32 of the motor 14 extends through the hub, as best shown in FIG. 2. A block 34 mounts to the base plate, preferably by bolts 36. A body 38 also mounts to the base plate 12. The body 38 is actually an elongated member mounted to the base plate 12 in vertical orientation, and partially recessed within the block 34. Structurally, the body 38 and its attendant structural components are practically identical to the deburring piece formerly used by applicant in conjunction with a drill press, as described in the background section of this application.

A collar 40 surrounds the body 38, and the collar 40 is preferably vertically movable with respect to the body 38 via intermeshed internal threads (not shown) sized to cooperate with external threads 42 of the body 38. According to this construction, it is preferable to use an O-ring (not shown) between the body 38 and the collar 40 to prevent metal filings from wedging between the body 38 and the collar 40 and destroying the threads. A countersink 44 mounts adjacent an upper end of the body 38, and the countersink 44 is oriented horizontally and adapted to rotate about its horizontal axis.

FIG. 2 shows a variation of the stand-alone deburring apparatus 10 shown in FIG. 1. Primarily, FIG. 2 shows a second plate 46 hingedly connected to the base plate 12. According to this variation, the control panel 20 mounts to the second plate 46, and because second plate 46 is hingable, the control panel 20 may be located at a desired angle with respect to the base plate 12 to facilitate manipulation of the controls.

FIG. 2 also shows in greater detail the orientation of the shaft 32 with respect to the collar 40, the body 38 and the countersink 44. More specifically, collar 40 is located between the shaft 32 and the countersink 44.

Figure 3:
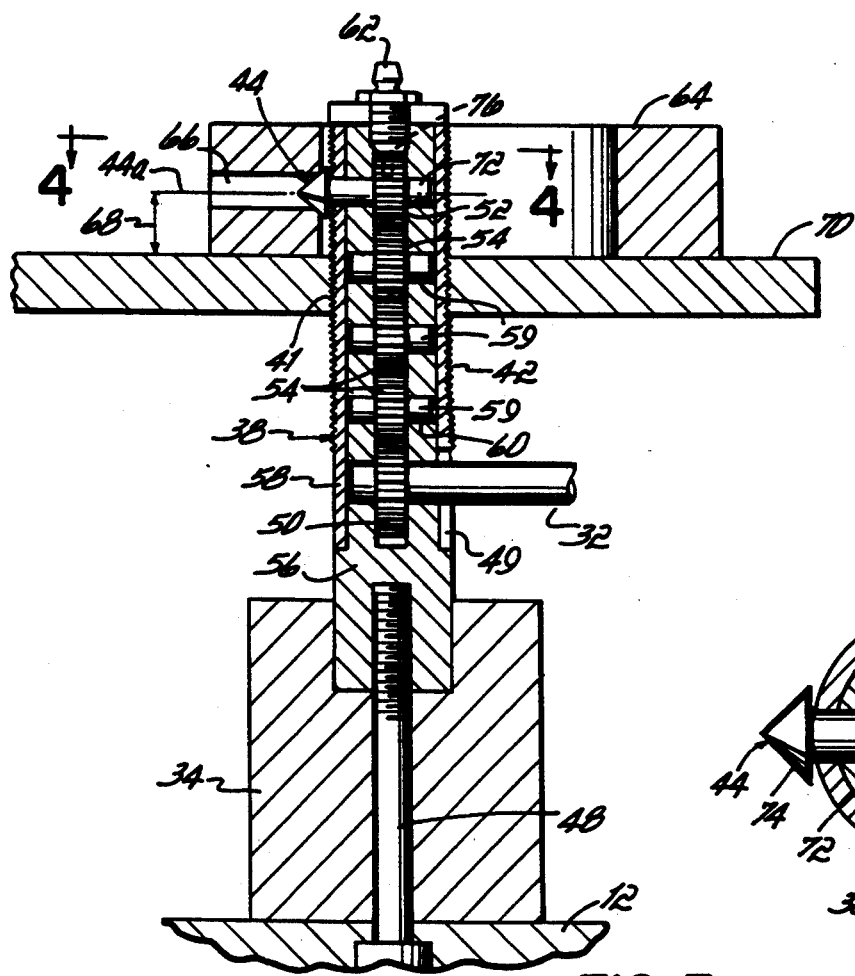
FIG. 3 is a longitudinal cross sectional view of the plate, the body, the collar and the countersink of the stand-alone deburring apparatus shown in FIGS. 1 and 2, during deburring of the inside surface of a tube.

FIG. 3 shows these structural components in even greater detail. More particularly, FIG. 3 shows the block 34 secured to base plate 12 via a bolt 48 extending vertically through a bottom of the block 34 and threadably secured to a bottom end of the body 38. The shaft 32 extends through an opening 49 in the body 38 so as to coact with a lowermost gear 50 of a plurality of gears housed within the body 38. The lowermost gear 50 is rotatably driven about a horizontal axis via rotation of the shaft 32. This in turn drives all of the other gears, including an uppermost gear 52 which coacts with the countersink 44 to rotate the countersink 44 about its longitudinal, horizontal axis. The body 38 also houses an odd number of intermediate gears 54 located between the lowermost gear 50 and the uppermost gear 52.

Preferably, there is an odd number of intermediate gears 54, thereby to provide an odd number of gears in total, counting the lowermost gear 50 and the uppermost gear 52. This assures that the countersink 44 is always rotatably driven in a right-handed manner, the direction for which it has been machined for cutting purposes. Preferably, all of the gears are toothed gears and mounted in intermeshed relationship. The teeth of at least one of the gears are adapted to shear upon application of a force equal to or greater than a predetermined magnitude. This shearing decouples the shaft 32 from the countersink 44, a result which is preferable to stalling or possibly damaging the motor 14 via a sudden stopping of the shaft 32, as may occur if the countersink 44 is placed in engagement with an immovable surface.

FIG. 3 also shows in greater detail the separate components of the body 38. More particularly, body 38 includes a lower portion or yoke 56, an upper end of which extends vertically inside an upper portion, or shell 58. The outer surfaces of the yoke portion 56 and the shell portion 58 define the opening 49 through which the shaft 32 extends. Also, the gears 50, 52 and 54 are held in place via machined axles 59 which are received within horizontal openings 60 in the yoke 56, and the shell portion 58 confines the axles 59 within these horizontal openings 60.

At an upper end of the body 38, an end piece 61 is secured thereto via a bolt 62. FIG. 3 also shows the bottom end of a tube 64 located in a position such that the countersink 44 engages the inside edge of a perpendicular hole 66 machined through the tube 64. Reference numeral 68 indicates the vertical distance between the bottom of the hole 66 and an upper support surface 70 of the collar 40. Preferably, prior to deburring, the collar 40 is rotatably moved to a position with respect to the countersink 44 such that the countersink 44 is vertically centered within the hole 66. This maximizes the effectiveness of deburring along the inside surface of the tube 64, around the inner edge of the hole 66. If this centering dimension 68 changes for a different tube 64, collar 40 is vertically adjusted, as necessary.

Figure 4:
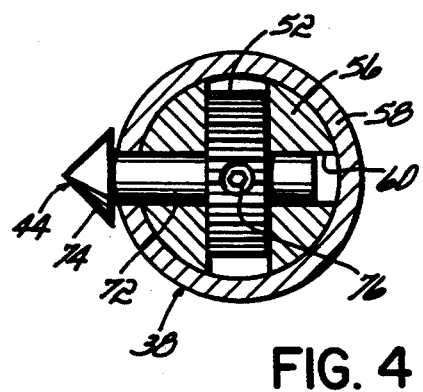
FIG. 4 is a cross sectional view taken along lines 4—4 of FIG. 3.

FIG. 4 shows in greater detail the mounting of countersink 44 to body 38, and particularly the uppermost gear 52. More particularly, the countersink 44 includes an inner portion 72 received within an inside diameter of the uppermost gear 52 in an interference fit, so that rotation of the uppermost gear 52 also rotatably drives the countersink 44, and in the same direction. The countersink 44 also includes a machined outer portion 74, which as mentioned above, is machined to deburr most effectively during right-handed rotation.

Figure 5:
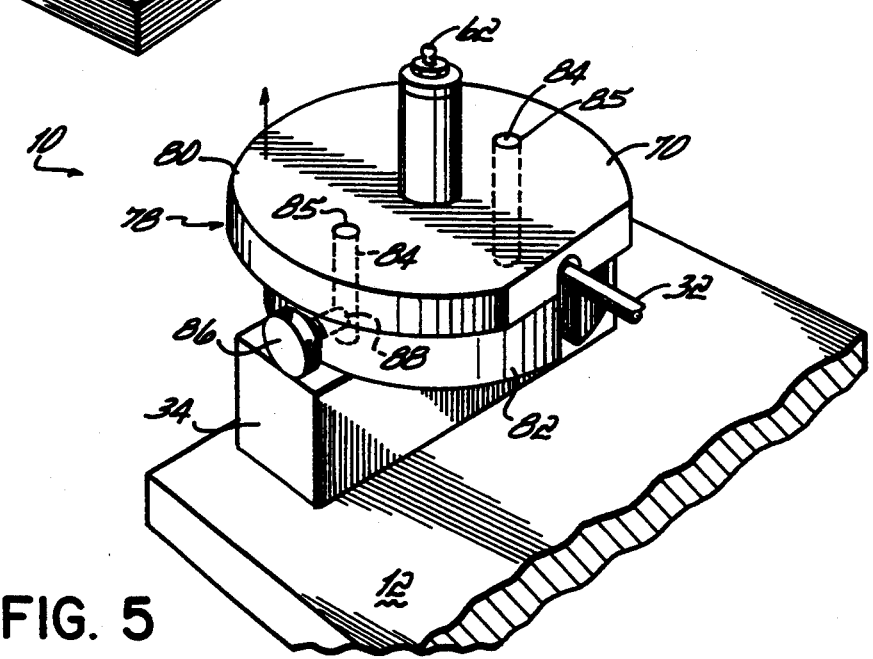
FIG. 5 is a perspective view of a portion of a stand-alone deburring apparatus constructed in accordance with a second preferred embodiment of the invention.

FIG. 5 shows the relevant portions of a stand-alone deburring apparatus 10 constructed in accordance with a second preferred embodiment of the invention. In this embodiment, the structural components for locating the support surface 70 with respect to the countersink 44 are somewhat different, but the principles are the same. The block 34 is again mounted to base plate 12. A collar section 78 surrounds the body 38, and the collar section 78 includes a top 80 and a bottom 82. Two posts 84 are embedded or received within recesses (not shown) formed in the block 34, on opposite sides of the body 38. The collar section 78 includes openings sized to receive the posts 84.

A knurled knob 86 connects to a threaded member 88 which is threadably received in horizontal orientation into the bottom 82 of the collar section 78. By positioning the collar section 78 at a desired vertical position with respect to the countersink 44, and then tightening knob 86 until an innermost end thereof resides in frictional engagement with the posts 84 (on both sides of block 76), the support surface 70 may be set at the desired vertical position.

Once the collar section 78 is set in its desired vertical position, deburring operations are the same as described above for the apparatus 10 shown in the other drawings.

With a variable speed motor 14 having a 0.5 horsepower, this stand-alone deburring apparatus 10 can be used to produce clean and precision deburring in seconds for holes 66 having a diameter ranging from 1/16" to ¾". Using a motor 14 with greater horsepower will allow a further increase in the diameter of holes 66 to be deburred. The apparatus 10 may also be used to deburr tubes 64 having an inner diameter ranging from ⅜" to 12". Finally, the body 38 is sized in vertical dimension to accommodate distances 68 ranging from zero to 18" or even higher, if necessary. To further accommodate deburring operations beyond the dimensions recited herein, the body 38 and its attendant structural components may be sized as desired, and a bottom end of these other bodies 38 constructed so as to be interchangeable to fit within the block 34.

In operation, a human operator first selects a body 38 and a corresponding countersink 44 which are suitably sized for the inner diameter of the tube 64 to be deburred, with the body 38 being of sufficient length to accommodate the distance 68 between the end of the tube 64 and the hole 66 around the edges of which the burrs are located. This step will not be necessary in many cases.

The collar 40 or collar section 78 is located in a desired vertical position with respect to the countersink 44. The tube 64 is then manually supported on the support surface 70, and the motor 14 is actuated to rotatably drive the shaft 32, the lowermost gear 50, the uppermost gear 52 and the countersink 44. The tube 64 is manipulated by the operator to effectively deburr the inner edges of one or more holes 66 located adjacent an end of the tube 64. With that accomplished, the other end of the tube 64 may be deburred in like fashion, or if the holes are located at only one end of the tubes, another tube may be deburred.

In this manner, this stand-alone deburring apparatus 10 provides consistent, high quality burr removal from the inside edges of holes 66 spaced from the ends of tubes 64. Moreover, because this apparatus 10 is designed to perform deburring as a separate, stand-alone operation, it eliminates the need to occupy a drill press, thus reducing the overall cost of deburring operations.

Moreover, because the body is oriented vertically and the countersink rotates about a horizontal axis, the apparatus 10 provides a continuous and consistent drive force for the countersink 44, regardless of the distance 68. Stated another way, the apparatus 10 is not susceptible to the sag which adversely affected the drive mechanism of the prior deburring piece used in conjunction with a drill press.

While two preferred embodiments of the invention are illustrated and described in considerable detail, it is not the intention of applicant to restrict or in any way limit the scope of the appended claims to such detail. Additional advantages and modifications will be readily apparent to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A deburring apparatus particularly suitable for deburring the inside of a tube, comprising:
   a base plate;
   a motor mounted to the base plate;

a horizontal shaft rotatably driven by the motor and having an outer end;

a body mounted to the base plate in substantially vertical orientation and located adjacent the outer end of the shaft;

a plurality of intermeshed gears housed within the body including lower and upper gears, the lower gear operatively connected to the outer end of the shaft and adapted to rotate therewith to also rotatably drive the rest of the gears, including the upper gear; and a countersink mounted in substantially horizontal orientation and rotatable about a horizontal axis, the countersink having an inner portion located in the body and operatively connected to the upper gear to be rotatably driven thereby, and a machined outer portion located outside of the body and adapted to deburr a surface of a tube placed thereagainst.

2. The deburring apparatus of claim 1 and further comprising:

a collar mounted to the body between the shaft and the upper gear, thereby to serve as a support surface for the tube during deburring thereof.

3. The deburring apparatus of claim 2 wherein the collar is vertically movable with respect to the countersink to accommodate various deburring locations with respect to the end of the tube.

4. The deburring apparatus of claim 3 wherein the collar is internally threaded and threadably engages external threads of the body, thereby to permit the vertical movement.

5. The deburring apparatus of claim 1 wherein the plurality of gears is an odd number.

6. The deburring apparatus of claim 1 wherein at least one of the gears has teeth adapted to sheer upon application of a predetermined force.

7. The deburring apparatus of claim 1 wherein the motor is a variable speed d.c. motor.

8. The deburring apparatus of claim 1 and further comprising:

a light housing;

a flexible conduit having an outer end connected to the light housing and an inner end secured to one of the base plate and the motor.

9. The deburring apparatus of claim 1 and further comprising:

a support member hingedly connected to the base plate; and a control panel for operating the motor mounted to the support member, the control panel operatively connected to the motor and adapted to control the operation thereof.

10. The deburring apparatus of claim 1 wherein the body further comprises:

a bottom yoke section secured to the base plate; and
a shell section removably secured to the yoke section.

11. The deburring apparatus of claim 10 and further comprising:

a block located between the yoke section and the base plate, the yoke section recessed at least partially within the block.

12. The deburring apparatus of claim 1 and further comprising:

a block located between the body and the base plate, the body recessed at least partially within the block;

a collar section surrounding the body and residing above the base plate, the collar section having an upper surface located between the countersink and the shaft;

a pair of posts located on opposite sides of the body and extending upwardly from the block and at least partially through the collar section; and means for adjusting the collar section at a desired vertical position with respect to the posts and for holding the collar section at the desired vertical position, thereby to position the upper surface at a desired height with respect to the countersink during deburring of the tube.

13. A stand-alone deburring apparatus comprising:

a base plate;

a motor secured to the base plate;

means for electrically driving the motor;

a horizontal, rotatable shaft connected to the motor and operatively driven thereby about a horizontal axis;

a vertically-extending body mounted to the plate in alignment with the shaft;

a plurality of toothed gears housed within the body, a lowermost of the gears operatively connected to the shaft so that all of the gears are rotatably driven thereby; and a countersink mounted to the body in horizontal orientation and having an inner portion operatively connected to an uppermost of the gears to be rotatably driven thereby about a horizontal axis upon rotation of the shaft, the countersink also having a machined outer portion adapted to deburr a burr spaced inwardly from the end of a tube and accessible via the inside of the tube, the apparatus thereby providing stand-alone removal of burrs accessible via the inside surface of the tube.

14. The deburring apparatus of claim 13 and further comprising:

a collar located between the shaft and the countersink and having an uppermost surface for supporting the tube during deburring thereof.

15. The deburring apparatus of claim 14 wherein the collar is vertically adjustable with respect to the countersink to locate the uppermost surface at different heights to accommodate different burring distances.

16. The deburring apparatus of claim 13 wherein the body and the countersink are sized to accommodate tubes having an internal diameter ranging from $\frac{3}{8}"$ to 12".

17. The deburring apparatus of claim 13 wherein the outer portion of the countersink has an external diameter sized to debur the inner edges of holes having a diameter ranging from 1/16" to $\frac{3}{4}"$.

18. A stand-alone deburring apparatus comprising:

a base plate;

a body mounted to the base plate and extending vertically therefrom along a vertical axis;

a countersink rotatably mounted to the body, the countersink oriented horizontally and rotatable about a horizontal axis;

a collar with an upper horizontal support surface surrounding the body below the countersink, the collar being vertically adjustable to position the support surface a desired distance below the countersink; and means for rotatably driving the countersink, thereby to deburr a burr accessible via the inside of an elongated tube when the tube is held such that an axis therethrough is in alignment with the body axis and the tube is supported on the upper surface.

* * * * *